US 9,350,568 B2

(12) United States Patent
Klein et al.

(10) Patent No.: US 9,350,568 B2
(45) Date of Patent: May 24, 2016

(54) POWER MANAGEMENT IN HYBRID NETWORKS

(75) Inventors: Philippe Klein, Jerusalem (IL); Avi Kliger, Ramat Gan (IL)

(73) Assignee: BROADCOM CORPORATION, Irvine, CA (US)

( * ) Notice: Subject to any disclaimer, the term of this patent is extended or adjusted under 35 U.S.C. 154(b) by 890 days.

(21) Appl. No.: 13/170,627

(22) Filed: Jun. 28, 2011

(65) Prior Publication Data

US 2013/0003746 A1    Jan. 3, 2013

(51) Int. Cl.
*H04L 12/66*    (2006.01)
*H04L 12/10*    (2006.01)
*H04L 12/46*    (2006.01)
*H04W 84/12*    (2009.01)
*H04W 52/02*    (2009.01)

(52) U.S. Cl.
CPC ............... *H04L 12/66* (2013.01); *H04L 12/10* (2013.01); *H04L 12/46* (2013.01); *H04W 52/02* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,079,904 B1 * | 7/2006 | Forstrom et al. | 700/28 |
| 8,068,011 B1 * | 11/2011 | Sajadi et al. | 340/10.4 |
| 2002/0101877 A1 * | 8/2002 | Gan | 370/437 |
| 2003/0050103 A1 * | 3/2003 | Tourrilhes et al. | H04W 52/0229 455/574 |
| 2004/0224668 A1 * | 11/2004 | Shell et al. | 455/412.1 |
| 2006/0225021 A1 * | 10/2006 | Padalia et al. | 716/17 |
| 2006/0239278 A1 * | 10/2006 | Hurst et al. | 370/401 |
| 2009/0092133 A1 * | 4/2009 | Mok et al. | 370/389 |
| 2009/0135751 A1 * | 5/2009 | Hodges et al. | 370/311 |
| 2010/0077243 A1 * | 3/2010 | Wang et al. | 713/323 |
| 2011/0047370 A1 * | 2/2011 | Nagel et al. | 713/150 |
| 2012/0010757 A1 * | 1/2012 | Francino et al. | 700/291 |
| 2012/0029714 A1 * | 2/2012 | Brian et al. | 700/291 |

* cited by examiner

*Primary Examiner* — Kodzovi Acolatse
(74) *Attorney, Agent, or Firm* — Foley & Lardner LLP

(57) ABSTRACT

Disclosed are various embodiments for power management in hybrid networks. In one embodiment, a network power manager is configured to manage power consumption in a hybrid network by controlling an operational state of a plurality of ports in a plurality of nodes of the hybrid network. The hybrid network comprises a plurality of interconnected networks, where each interconnected network employs a corresponding one of a plurality of communication mediums, and each of the communication mediums is unique with respect to each other.

33 Claims, 4 Drawing Sheets

POWER MANAGEMENT IN HYBRID NETWORKS

BACKGROUND

Many different types of technologies exist for home networking. Some homes have Category 5e or better unshielded twisted pair (UTP) cabling running to various locations, and Institute of Electrical and Electronics Engineers (IEEE) 802.3 Ethernet may be run over this type of cable. However, many homes may not be wired for Ethernet, and it may be cost prohibitive to add such wiring. IEEE 802.11 Wi-Fi is an alternative that allows for wireless home networking, but it may be susceptible to degraded performance due to interference, distance, line-of-sight obstructions, etc. HomePNA (HPNA) and Multimedia over Coax Alliance (MoCA) provide standards for networking over plain old telephone service (POTS) cable and coaxial cable, respectively, which may already be present in rooms for telephone and/or television service. Power line communication (PLC) standards, such as, e.g., IEEE 1901, HomePlug AV, etc., provide for networking over alternating current (AC) power wiring, which may be available at any power outlet. Due to the differing characteristics of the various networking technologies, the rate of power consumption of each of these different networking technologies may vary.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to power consumption management in converged data communication networks employing multiple heterogeneous link layer technologies. Such hybrid networks offer the ability to connect devices in home networks or other networks using multiple different link layer networking technologies such as, for example, IEEE P1901 power line communications (PLC), IEEE 802.11 Wi-Fi, IEEE 802.3 Ethernet, Multimedia over Coax Alliance (MoCA) 1.1, and/or other networking technologies. Hybrid networks that employ multiple different link layer networking technologies include an abstraction layer that provides a common data and control service access point to heterogeneous networking technologies to provide a seamless user experience. The different networking technologies may be employed due to the location of the network device in the home, the capabilities of the network device, specific quality-of-service needs of the application, and/or other reasons.

According to various embodiments, a power consumption manager is employed to control various ports in a hybrid network to provide for reduced power consumption while maintaining Quality of Service QoS and other minimum performance constraints and benchmarks.

Figure 1:
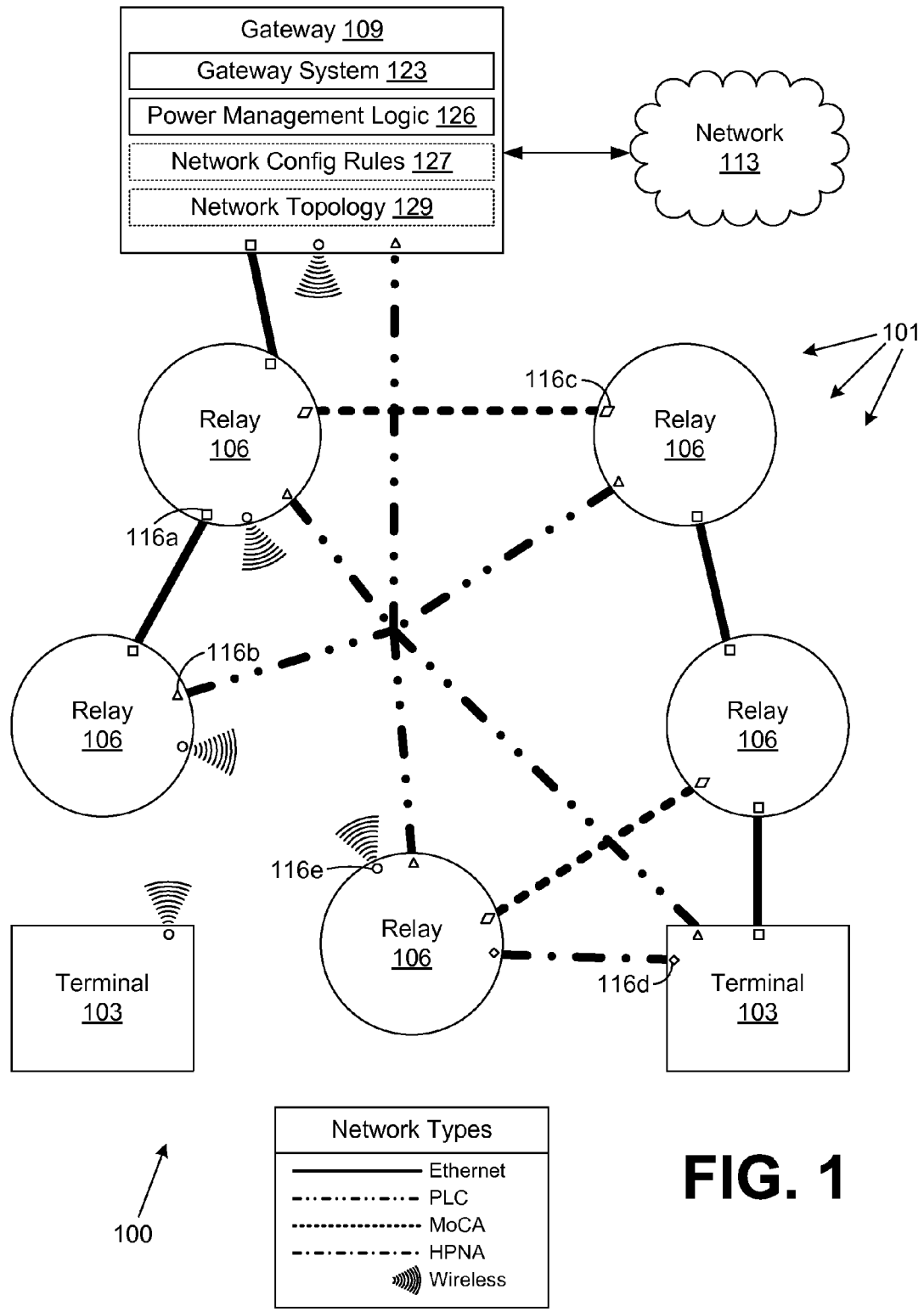
FIG. 1 is a drawing that illustrates a first operational state of a hybrid network according to various embodiments of the present disclosure.

With reference to FIG. 1, shown is one example of a hybrid network 100 according to various embodiments. The hybrid network 100 facilitates data communication among a plurality of nodes 101 that include terminals 103, a plurality of relays 106, and a gateway 109. The hybrid network 100 is coupled to an external network 113 through the gateway 109. The external network 113 includes, for example, the Internet, intranets, extranets, wide area networks (WANs), local area networks (LANs), wired networks, wireless networks, or other suitable networks, etc., or any combination of two or more such networks. Although the gateway 109 and network 113 are shown in FIG. 1, the gateway 109 and/or the network 113 may be absent from other examples of hybrid networks 100.

The terminals 103 and relays 106 correspond to various network devices, which may include any type of computing device. Each terminal 103 and relay 106 corresponds to a network device that includes an abstraction layer between its logical link control (LLC) layer and the underlying heterogeneous link layers (media access control/physical layers (MAC/PHY)). Each terminal 103 is able to send network management frames to other nodes 101 on the hybrid network 100. Each relay 106 is able to relay network management frames as well as data frames to other nodes 101 on the hybrid network 100.

In the example of FIG. 1, the hybrid network 100 employs five heterogeneous link layer technologies or network types. Such network technologies or types include Ethernet, PLC, MoCA, HomePNA (HPNA) connection over phone line, and Wi-Fi. The networking technologies shown in FIG. 1 constitute merely one non-limiting example of the heterogeneous networking technologies that may be employed in a hybrid network 100. The links between the terminals 103, relays 106, and the gateway 109 are illustrated in FIG. 1 using the respective indicia from the legend of FIG. 1.

Within the terminals 103, relays 106, and gateway 109 are ports 116*a-e* represented by respective shapes in FIG. 1. Specifically, the ports 116*a-e* include Ethernet ports 116*a*, PLC ports 116*b*, MoCA ports 116*c*, HPNA ports 116*d*, Wi-Fi ports 116*e*, and potentially other types of ports for other networking technologies. Thus, the hybrid network 100 is made up of several interconnected networks, where each of these interconnected networks employs a corresponding one of the different communications mediums associated with the various networking technologies described above, and potentially other networking technologies. In one embodiment, such communications mediums are unique with respect to each other as described above. As contemplated herein, a link involves the path between a pair of nodes 101 in the hybrid network 100. In addition, a pathway involves a route of data traffic through the hybrid network and may involve one or more links.

The gateway 109 may include a gateway system 123, power management logic 126, and other executable applications and/or digital logic. The gateway 109 may store data such as network configuration rules 127, a network topology 129, and/or other data. In the common case, the gateway system 123 provides access to the external network 113 for the terminals 103 and relays 106 through a cable modem, digital subscriber line (DSL), WiMAX, plain old telephone service (POTS) dial-up, integrated services digital network (ISDN), T1, and/or another type of connection. The gateway system 123 may include routing functionality, firewall functionality, network address translation (NAT) functionality, and/or other functionality.

The power management logic 126 is executed in the gateway 123 to manage the power consumption of the various devices in the hybrid network 100. According to one embodiment, the power management logic 126 is executed to manage the power consumption of the hybrid network 100 to minimize the power consumption at any given time. The current operational configuration of the hybrid network 100 is maintained in the data representing the network topology 129. To this end, the power management logic 126 employs the network configuration rules 127 to identify when a change can be made to the operation of the hybrid network 100 in order to improve or reduce power consumption while at the same time maintaining quality of service (QoS) and any other minimum performance benchmarks as will be described.

The network topology 129 includes information about each node (e.g. terminal 103, relay 106, gateway 109) in the hybrid network 100 as well as the interconnections between such nodes. For example, the network topology 129 may include a listing of each node or device in the hybrid network 100 and the operational states of each of these nodes. Such nodes may include operational states or modes such as full on mode, sleep mode, hibernation mode, off mode, power savings mode, and other potential modes. Power consumption of a given node may depend upon the operational mode or state of the node at any given time as can be appreciated.

Each node in the hybrid network 100 may include multiple different ports 116a-e so as to be capable of coupling to, or establishing data communication with, one or more of the different types of networks that make up the hybrid network 100. The network topology 129 includes a listing of each type of port 116a-e included in each node in the hybrid network 100, as well as the operational state of such ports 116a-e. Each of the ports 116a-e may or may not be configured to operate in one of multiple modes or states in a manner similar to the operational modes or states of the nodes themselves. To this end, a given port 116a-e may be placed in a full on mode, off mode, sleep/hibernation mode, power savings mode, or other type of operation mode or state, where power consumption of a given node may depend at least partly on the states or modes of the ports 116a-e of the node. In addition, each of the nodes may include a routing table or other data structure that allows data traffic to be routed through the hybrid network 100.

The network topology 129 may also include further information about each node, and each port 116a-e associated with each node in the hybrid network 100. For example, such information may include a wake-up latency from a sleep or off mode to a fully operational mode for each port 116a-e of each node 101. Also, other mode transition latencies may be stored in association with each node and in association with each port 116a-e of each node, where such nodes/ports have multiple different modes or states of operation.

In addition, the network topology 129 may include information indicating the buffering capability of each port 116a-e of each node in the hybrid network 100. Such information may be useful in determining whether data traffic can be routed to a given port 116a-e even though such a port may be asleep or off, where the buffer can store data until the port can be transitioned to an "on" state as can be appreciated.

Still further, the network topology 129 includes power consumption statistics associated with each node 101 and associated with each port 116a-e of each node 101. Such statistics may include, for example, the rates of power consumption of nodes 101/ports 116a-e in their various operational modes or states. Such information may be used to identify which ports 116a-e to power down, place in a sleep mode, maintain in an operational mode, or place in some other mode so as to minimize the power employed by the hybrid network 100.

The network topology 129 may include information about the data transmission latency presented by each node 101 in the hybrid network 100. Specifically, such information may include the time it takes for data to transition through a respective pair of ports 116a-e of a given node 101 and other latency information. Such information may be used to ensure that the hybrid network 100 is maintained in a minimum state so as to ensure required quality of service QoS is maintained and for other potential reasons.

In addition, various operational constraints that are applied to the hybrid network 100 may be stored as part of the network topology 129 or in some other data structure. Such operational constraints may comprise, for example, maximum acceptable wake-up or mode transition latencies that can be tolerated on the hybrid network 100. Also, such constraints may specify minimum communication capabilities that can be tolerated so that the power management logic 126 can always maintain connectivity with each node 101 in the hybrid network 100.

As previously mentioned above, the hybrid network 100 includes several nodes 101 that comprise terminals 103, relays 106, and a gateway 109 that are all in communication with each other through various links. Each node 101 in the hybrid network 100 may include one or more ports 116a-e as described above. As shown in FIG. 1, each of the ports 116a-e for each node 101 in the hybrid network 100 is in an active operational state, where the hybrid network 100 is operating at a maximum rate of power consumption. Specifically, all ports 116a-e are active, including wireless ports 116e that transmit signals wirelessly as can be appreciated.

Figure 2:
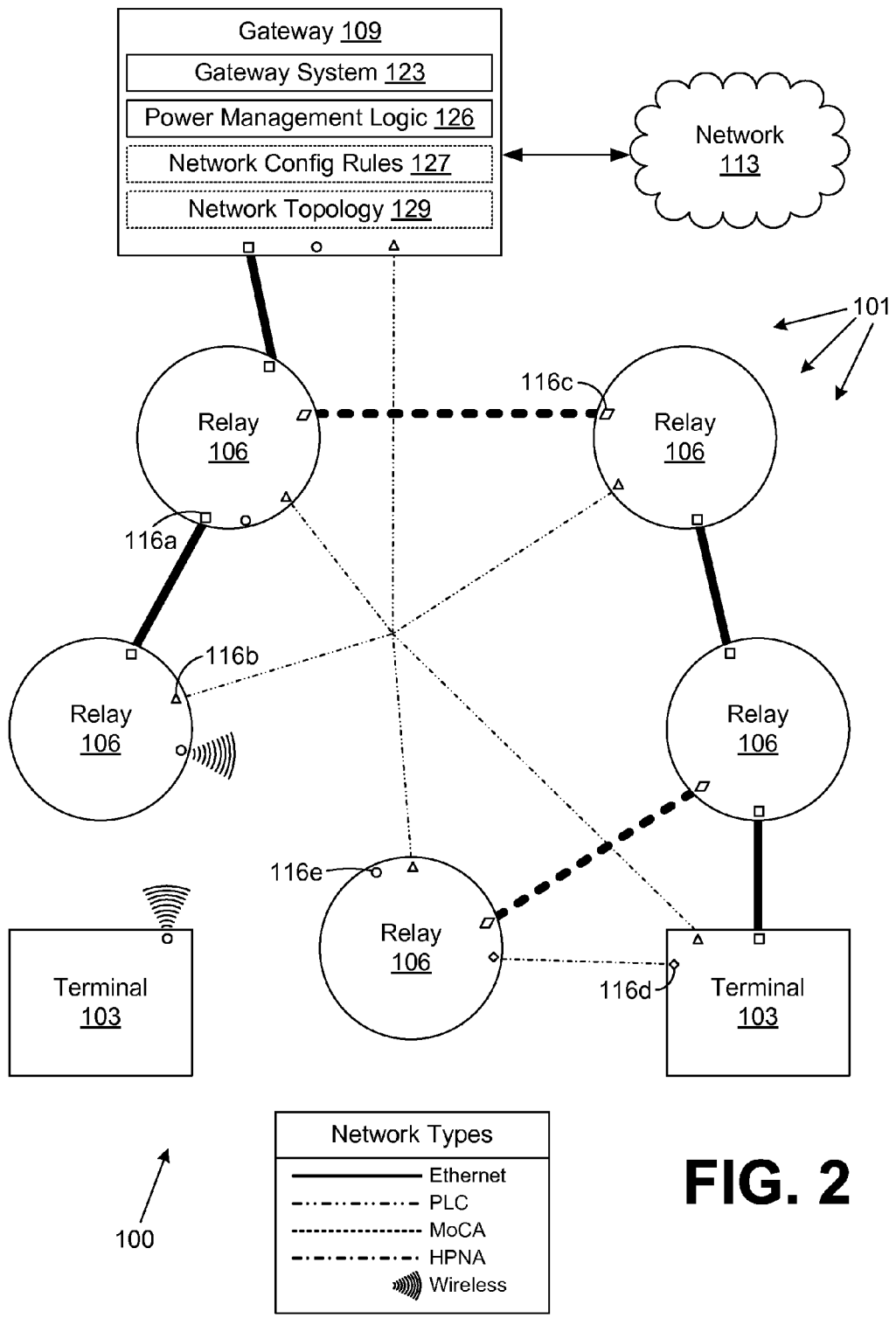
FIG. 2 is a drawing that illustrates a second operational state of the hybrid network of FIG. 1 according to various embodiments of the present disclosure.

With reference to FIG. 2, shown is another example of the hybrid network 100 in which the power management logic 126 is implemented to cause the hybrid network 100 to operate at a minimum rate of power consumption. To this end, active links between respective ports 116a-e are shown by thick lines, and inactive links due to inactive ports are shown by thin lines.

According to one embodiment, the power management logic 126 in the gateway 109 can contact each node 101 within the hybrid network 100 through the various active links that remain. To this end, according to one embodiment, the hybrid network 100, as depicted in FIGS. 1 and 2, operates constrained by a mandate that a minimum operational configuration must be maintained to allow the power management logic 126 and other components in the gateway 109 to ultimately communicate with each node 101 within the hybrid network 100 so that various ports 116a-e can be commanded to wake-up or activate when needed.

Figure 3:
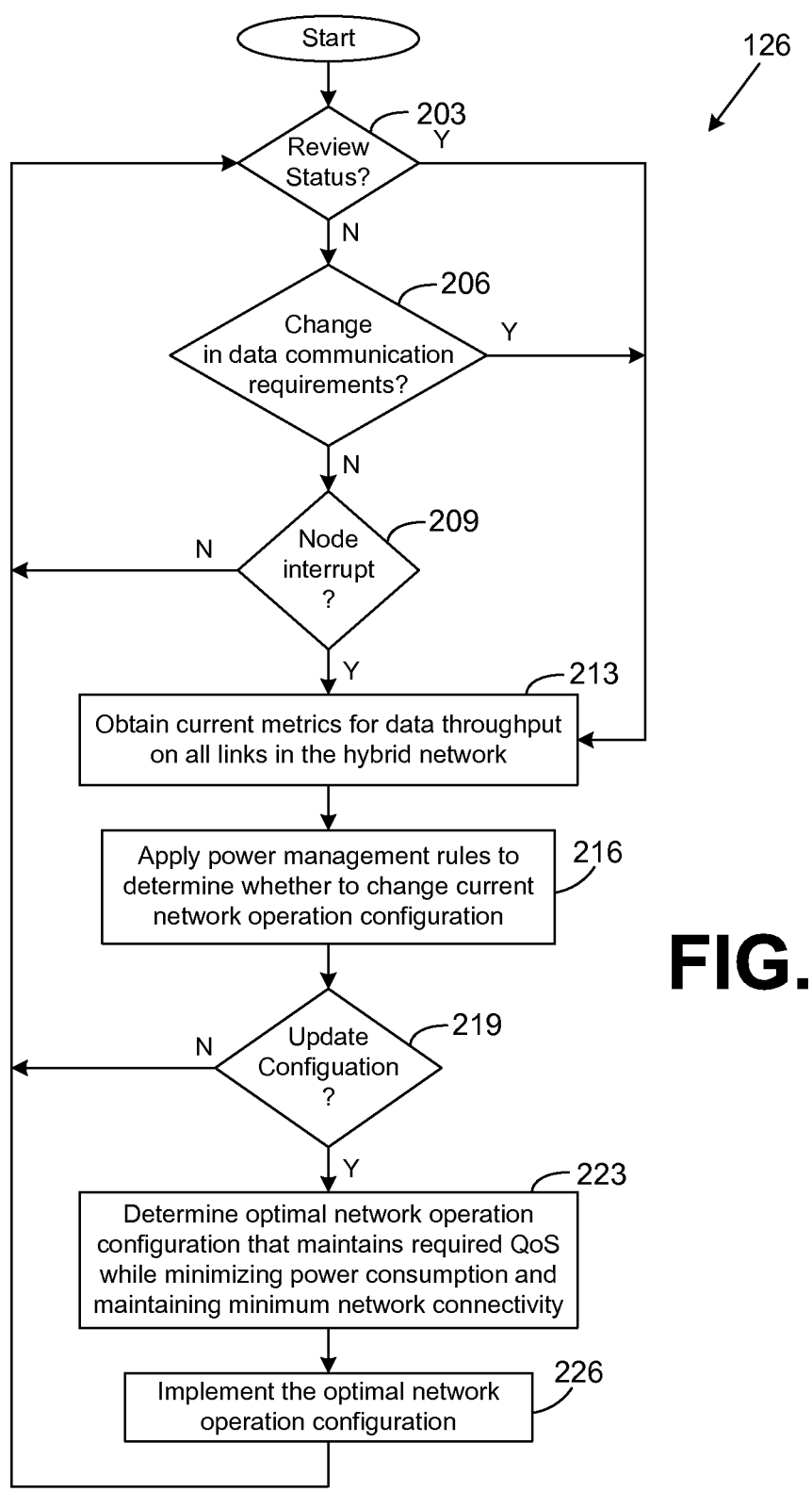
FIG. 3 is a flowchart illustrating an example of functionality of power management logic implemented in a device in the hybrid network of FIG. 1 according to various embodiments of the present disclosure.

Referring next to FIG. 3, shown is a flowchart that provides one example of the operation of a portion of the power management logic 126 according to various embodiments. It is understood that the flowchart of FIG. 3 provides merely an example of the many different types of functional arrangements that may be employed to implement the operation of the portion of the power management logic 126 as described herein. As an alternative, the flowchart of FIG. 3 may be viewed as depicting an example of steps of a method implemented by a processor circuit and/or other logical circuitry in the gateway 109 (FIG. 1) according to one or more embodiments.

According to the flowchart of FIG. 3, the power management logic 126 is implemented to control the operational states of the various ports 116a-e (FIG. 1) in various nodes 101 (FIG. 1) in order to minimize the consumption of power in the hybrid network 100 (FIG. 1) while at the same time meeting all minimum operational constraints placed on the operation of the hybrid network 100.

According to one embodiment, the power management logic 126 is configured to periodically review the status of the hybrid network 100 to determine whether to update the current operational topology of the hybrid network 100. As contemplated herein, the current operational topology includes all of the various information about the network topology 129 (FIG. 1) described above, including the operational states of each node 101 and each port 116a-e in each node 101. The power management logic 126 may determine whether to review and possibly update the status of the operation of the hybrid network 100 based upon a periodic timer, based upon a change in a bandwidth reservation in the hybrid network 100, or upon receipt of a message or interrupt from a respective one of the nodes 101 in the hybrid network 100 that may indicate such a review is needed.

To begin in box 203, the power management logic 126 determines whether it is to review the status of the hybrid network 100 to determine whether the various ports 116a-e should be transitioned to various states to maintain the minimum data communication configuration necessary for meeting all constraints placed on the hybrid network 100 and at the same time minimizing the power consumption of the hybrid network 100. Assuming that the power management logic 126 determines that it is to review the status of the hybrid network 100, then the power management logic 126 progresses to box 213. Otherwise, the power management logic 126 proceeds to box 206.

In box 206, the power management logic 126 determines whether there is a change in the communication requirements for the hybrid network 100. Such a change may occur in situations where bandwidth is expressly reserved over various links in the hybrid network 100, where prior knowledge exists as to the requirements for data communication between respective nodes in the hybrid network 100. If a change in data communication requirements is determined to be necessary in box 206 as determined by a request for additional bandwidth across a respective link or based on some other request, the power management logic 126 progresses to box 213. Otherwise, the power management logic 126 proceeds to box 209.

In box 209, the power management logic 126 determines whether a message has been received from a given node indicating that a review of the operational status of the hybrid network 100 is needed. Such may be the case, for example, where nodes are unable to maintain data communications according to predefined constraints or in other situations as can be appreciated. For example, in some situations, a given node 101 may wish to transition to a sleep or hibernation mode due to a lack of data traffic through such node 101. Such a node 101 may send a message to the power management logic 126 requesting to transition to such sleep or hibernation mode.

If a message or request from a node 101 indicates that it is necessary to review the operational status of the hybrid network 100, then the power management logic 126 progresses to box 213. Otherwise, the power management logic 126 reverts back to box 203. Thus, boxes 203, 206, and 209 present conditions that, when met, cause the power management logic 126 to review the operational status of the hybrid network 100 as described above.

In box 213, the power management logic 126 obtains current metrics that indicate the data throughput on all of the links in the hybrid network 100. This may be accomplished by sending control messages to each of the nodes 101 within the hybrid network 100 to obtain the required metrics as can be appreciated. Various control channels may be specified for the hybrid network 100 so that such messaging may be accommodated. Thereafter, in box 216, the network configuration rules 127 (FIG. 1) may be applied to the current network topology 129 given the metrics obtained in box 213 to determine whether to change or update the current network topology or operational configuration.

The network configuration rules 127 may include, for example, detecting according to a predefined standard whether a given one of the links in the hybrid network 100 is underused, thereby giving rise to a situation where data traffic of two or more links or pathways in the hybrid network 100 may be consolidated. Specifically, such a network configuration rule 127 may specify that, if possible, data traffic over a given link that falls below a predefined threshold must be consolidated with other data traffic transmitted across an alternative pathway in the hybrid network 100.

In addition, another network configuration rule 127 may specify that if a link between nodes 101 in the hybrid network 100 is overused according to a predefined threshold such that the bandwidth of such link is overused or stressed, then the power management logic 126 may decide to activate other links that are currently inactive and redirect traffic over such newly activated links to relieve the burden upon an overused link. Thus, according to one embodiment, such a network configuration rule 127 may specify that if data traffic over a link in the hybrid network 100 exceeds a predefined threshold, then one or more other inactive links must be activated. Also, in one embodiment, at least a portion of the data traffic previously transmitted over the link may be rerouted across the newly activated links or resulting pathways.

A further network configuration rule 127 may specify that if various links in the hybrid network 100 become inoperative, then the current network topology should be updated. Also, a further network configuration rule 127 may specify that the current network topology should be updated if an inactive link is made active at the initiative of a respective pair of nodes 101 in the hybrid network 100 due to the fact that other links may have become inoperative.

In addition, a network configuration rule 127 may specify that the current network topology should be updated when new nodes 101 with corresponding new links are added to the hybrid network 100. In addition, other network configuration rules 127 may be applied to determine whether to update or change the current network topology to potentially provide for the proper operation of the hybrid network 100 while, at the same time, minimizing power consumption by the hybrid network 100.

Next, in box 219, the power management logic 126 determines whether any of the rules applied in box 216 mandate that the network operation configuration needs to be changed. If such is the case, then the power management logic 126 proceeds to box 223. Otherwise, the power management logic 126 reverts back to box 203 as shown.

In box 223, the power management logic 126 determines the optimal network topology that would maintain the required Quality of Service (QoS) while minimizing the power consumption on the hybrid network 100. Also, operation is maintained according to any predefined operational constraints imposed on the hybrid network 100.

In order to accomplish this, according to one embodiment, the power management logic 126 may first identify all possible operational topologies of the hybrid network 100 that would maintain the required Quality of Service, minimize power consumption, and meet any network constraints. The network constraints may comprise, for example, minimum wake-up latencies, minimum communication latency between nodes 101, required buffering capabilities, or other network constraints.

Once one or more possible operational topologies are identified, an optimal one of the possible operational topologies may be identified for implementation. In one embodiment, the optimal one of the possible operational topologies may simply be the possible operational topology that uses the least amount of power. Alternatively, the determination as to the optimal one of the topologies may be based on several factors including, for example, the rate of power consumption of each possible operation topology, a communication latency associated with the various data pathways in each of the possible operational topologies, a wake up latency associated with each node 101 in each of the possible operational topologies, a buffering capability associated with each node 101 in each of the possible operational topologies, or other factors as can be appreciated.

In one embodiment, a cost function may be employed to generate a value based on multiple factors as described above. To this end, the optimal possible network topology may be selected to implement in the hybrid network 100 that has the lowest calculated cost as can be appreciated.

Assuming that the optimal one of the possible network topologies is selected, then the power management logic 126 proceeds to box 226 to implement the optimal possible network topology in the hybrid network 100. To this end, the power management logic 126 may send control messages to various nodes 101 within the hybrid network 100 to cause various ports 116*a-e* to transition to required operational states or modes, and/or to cause respective nodes 101 to transition their operational states where applicable. In addition, routing tables may be changed in the respective nodes 101 to ensure that data is transmitted accordingly through the various remaining active links in the hybrid network 100. Thereafter, the power management logic 126 reverts back to box 203 as shown.

Figure 4:
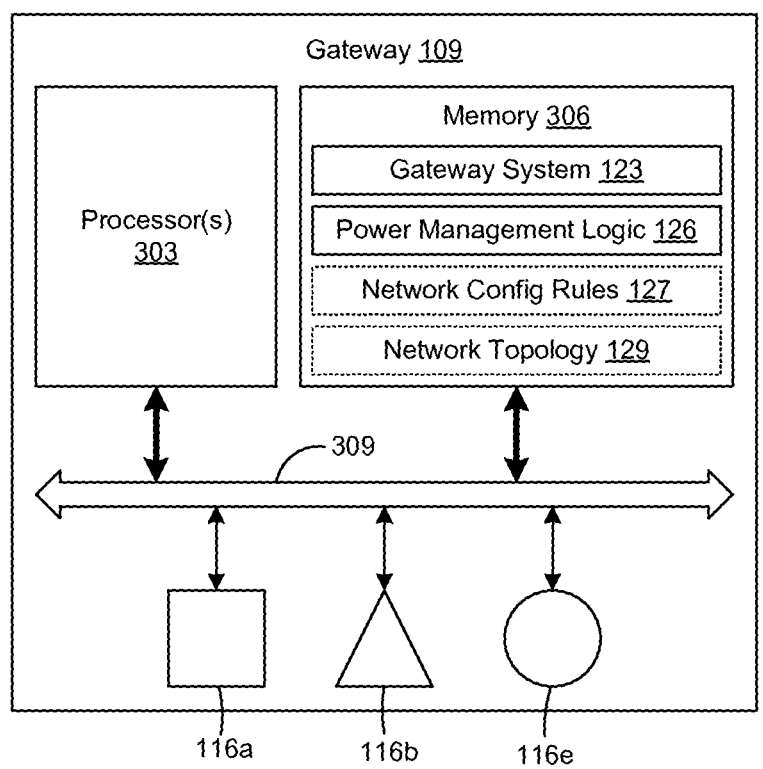
FIG. 4 is a schematic block diagram that provides one example illustration of a device in the hybrid network of FIG. 1 according to various embodiments of the present disclosure.

With reference to FIG. 4, shown is a schematic block diagram of one example of the gateway 109 according to an embodiment of the present disclosure. The gateway 109 includes at least one processor circuit, for example, having a processor 303 and a memory 306, both of which are coupled to a local interface 309. The local interface 309 may comprise, for example, a data bus with an accompanying address/control bus or other bus structure as can be appreciated. In addition, various ports 116*a*, 116*b*, and 116*e* may also be coupled to the local interface 309. Alternatively, other architectures may be employed to facilitate data transmission through the respective ports 116*a*, 116*b*, and 116*e*. In addition, the gateway 109 may include other types of ports such as ports 116*c* and 116*d*.

Stored in the memory 306 are both data and several components that are executable by the processor 303. In particular, stored in the memory 306 and executable by the processor 303 are the gateway system 123, the power management logic 126, and potentially other systems, applications, and/or logic. Also stored in the memory 306 are the network configuration rules 127, the network topology 129, and potentially other data that facilitates the operation of the gateway 109.

According to one embodiment, various components such as the gateway system and the power management logic 126 may be embodied in the form of software that is stored in the memory 306 and is executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network that facilitates communication between any two of the multiple processors 303, between any processor 303 and any of the memories 306, or between any two of the memories 306, etc. The local interface 309 may comprise additional systems designed to coordinate this communication, including, for example, performing load balancing.

Although the gateway system 123, the power management logic 126, and other various systems described herein may be embodied in software or code executed by a processor circuit as discussed above, as an alternative the same may also be embodied in dedicated hardware or a combination of software and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows an example of functionality and operation representative of the power management logic 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor circuit or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the gateway system 123 and the power management logic 126, that comprises software or code can be embodied in any non-transitory computer-readable medium for use by or in connection with an instruction execution system such as, for example, a processor circuit or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a processor circuit; and
   a network power manager executable by the processor circuit to manage power consumption in a hybrid network by controlling an operational state of a plurality of ports in a plurality of nodes of the hybrid network, the plurality of nodes in data communication by way of the hybrid network, the hybrid network employing a plurality of link layer technologies, two or more of the plurality of nodes comprising a first port employing a first link layer technology and a second port employing a second link layer technology different from the first link layer technology, wherein the operational state of each of the plurality of ports comprises one of an active state or an inactive state, the network power manager configured to:
   determine a first operational topology for the hybrid network, the first operational topology providing communication between the plurality of nodes via a first set of the plurality of ports utilizing a first set of one or more of the plurality of link layer technologies;
   determine a second operational topology for the hybrid network, the second operational topology providing communication between the plurality of nodes via a second set of the plurality of ports different from the first set of ports utilizing a second set of one or more of the plurality of link layer technologies;
   determine one or more transitions in an operational state of one or more first ports of the plurality of ports of the plurality of nodes to transition from the first operational topology to the second operational topology; and
   switch the operational state of the one or more first ports between the active state and the inactive state through communication with one or more second ports of the plurality of nodes separately from control of an overall operational state of the plurality of nodes to implement the second operational topology.

2. The system of claim 1, wherein the network power manager further comprises logic that periodically determines whether to update a current operational topology of the hybrid network.

3. The system of claim 2, wherein the logic that periodically determines whether to update the current operational topology of the hybrid network further comprises logic that applies at least one rule to determine whether the current operational topology of the hybrid network should be updated.

4. The system of claim 1, further comprising a network topology stored in a memory accessible to the network power manager.

5. The system of claim 1, wherein the network power manager further comprises logic that identifies at least one possible operational topology of the hybrid network that may be employed to update a current operational topology of the network.

6. The system of claim 5, wherein the at least one possible operational topology of the hybrid network is required to meet at least one predefined operational constraint.

7. The system of claim 5, wherein the at least one possible operational topology further comprises a plurality of possible operational topologies, and the logic that identifies further comprises logic that determines an optimal one of the possible operational topologies based at least upon at least one factor.

8. The system of claim 7, wherein the at least one factor further comprises a rate of power consumption of each of the possible operational topologies.

9. The system of claim 8, wherein the at least one factor further comprises a latency associated with at least one data pathway in each of the possible operational topologies.

10. The system of claim 8, wherein the at least one factor further comprises a wake-up latency associated with at least one node in each of the possible operational topologies.

11. The system of claim 8, wherein the at least one factor further comprises a buffering capability associated with at least one node in each of the possible operational topologies.

12. The system of claim 7, wherein the at least one factor further comprises a plurality of factors, and the logic that determines the optimal one of the possible operational topologies based at least upon the plurality of factors further comprises a cost function that generates a value for each of the possible operational topologies based upon the factors, respectively, where the factors considered for each of the possible operational topologies include a rate of power consumption.

13. The system of claim 1, wherein the network power manager is configured to independently control the operational state of each of the plurality of ports.

14. The system of claim 1, wherein the network power manager is configured to change the operational state of one or more inactive ports of a first node to implement the operational topology by sending a message to an active port of the first node configured to cause the first node to change the one or more inactive ports from an inactive state to an active state.

15. The system of claim 14, wherein the inactive state is an off mode in which the inactive ports are powered down.

16. The system of claim 14, wherein the active port is in a low power state when the network power manager sends the message to the active port.

17. The system of claim 16, wherein the low power state is one of a sleep mode, a hibernation mode, or a power savings mode.

18. The system of claim 1, wherein the inactive state is one of an off state, a sleep state, a hibernation state, or a power savings state.

19. A method implemented in a hybrid network comprising a plurality of interconnected networks, each interconnected network employing a corresponding one of a plurality of communication mediums, each of the communication mediums being unique with respect to each other, the method comprising the steps of:
  determining, by an electronic gateway device configured to be connected to a plurality of nodes of the hybrid network, whether a current network topology of the hybrid network is to be updated by application of at least one rule, the at least one rule specifies at least one of:
    if possible, first data traffic over a link in the hybrid network that falls below a predefined threshold must be consolidated with second data traffic on an alternative pathway in the hybrid network; or
    if data traffic over a first link in the hybrid network that exceeds a predefined threshold, then at least one second link must be activated, where at least a portion of the data traffic is rerouted from the first link to the second link;
  identifying, by the electronic gateway device, a plurality of possible network topologies of the hybrid network if the at least one rule dictates that the current network topology is to be altered;
  selecting, by the electronic gateway device, one of the possible network topologies of the hybrid network that meets predefined operational constraints and that presents a lowest rate of power consumption; and
  implementing, by the electronic gateway device, the selected one of the possible network topologies in the hybrid network by controlling, from the electronic gateway device, an operational state of a plurality of ports in the plurality of nodes of the hybrid network, the electronic gateway device configured to control the operational state of a first port of a first node through communication with a second port of the first node separately from control of an overall operational state of the first node, the electronic gateway device configured to switch the operational state of the first port between at least a first state associated with a first level of power consumption and a second state associated with a second level of power consumption lower than the first level.

20. The method of claim 19, wherein the at least one rule specifies that, if possible, first data traffic over a link in the hybrid network that falls below a predefined threshold must be consolidated with second data traffic on an alternative pathway in the hybrid network.

21. The method of claim 19, wherein the at least one rule specifies that if data traffic over a first link in the hybrid network that exceeds a predefined threshold, then at least one second link must be activated, where at least a portion of the data traffic is rerouted from the first link to the second link.

22. A system, comprising:
  a hybrid network employing a plurality of link layer technologies; and
  a gateway associated with the hybrid network, the gateway coupling the hybrid network to an external network, the gateway including a processor circuit, the processor circuit configured to manage power consumption in the hybrid network by controlling an operational state of a plurality of ports in a plurality of nodes of the hybrid network, the plurality of nodes in data communication by way of the hybrid network, two or more of the plurality of nodes comprising a first port employing a first link layer technology and a second port employing a second link layer technology different from the first link layer technology, wherein the operational state of each of the plurality of ports comprises one of an active state or an inactive state, the processor circuit configured to:
    determine a first operational topology for the hybrid network, the first operational topology providing communication between the plurality of nodes via a first set of the plurality of ports utilizing a first set of one or more of the plurality of link layer technologies;
    determine a second operational topology for the hybrid network, the second operational topology providing communication between the plurality of nodes via a second set of the plurality of ports different from the first set of ports utilizing a second set of one or more of the plurality of link layer technologies;
    determine one or more transitions in an operational state of one or more first ports of the plurality of ports of the plurality of nodes to transition from the first operational topology to the second the operational topology; and
    switch the operational state of the one or more first ports between the active state and the inactive state through communication with one or more second ports of the plurality of nodes separately from control of an overall operational state of the plurality of nodes to implement the second operational topology.

23. The system of claim 22, wherein the interconnected networks further comprise an Ethernet network and a wireless network.

24. The system of claim 23, wherein the communication mediums further comprise a coaxial cable.

25. The system of claim 23, wherein the communication mediums further comprise an unshielded twisted pair (UTP) of wire.

26. The system of claim 23, wherein the communication mediums further comprise a power line.

27. A system, comprising:
a processor circuit operably coupled to a memory and configured to:
determine a first operational topology associated with a first power consumption for a hybrid network, the hybrid network employing a plurality of link layer technologies, the first operational topology providing communication between a plurality of nodes via a first set of a plurality of ports of the hybrid network utilizing a first set of one or more of the plurality of link layer technologies;
determine a second operational topology associated with a second power consumption for the hybrid network, the second operational topology providing communication between the plurality of nodes via a second set of the plurality of ports of the hybrid network utilizing a second set of one or more of the plurality of link layer technologies;
determine a change to an operational state for one or more inactive ports of the plurality of ports in the plurality of nodes of the hybrid network to transition from the first operational topology to the second operational topology;
generate a control message configured to cause the plurality of nodes to change the one or more inactive ports from an inactive state to an active state separately from control of an overall operational state of the plurality of nodes to transition from the first operational topology to the second operational topology; and
transmit the control message to one or more active ports of the plurality of nodes.

28. The system of claim 27, wherein each of the plurality of nodes comprising a set of one or more ports, and wherein the processor circuit is configured to independently control the operational state of each of the ports in the plurality of nodes.

29. The system of claim 27, wherein the inactive state is an off mode in which the inactive ports are powered down.

30. The system of claim 27, wherein the processor circuit is configured to determine the change to the operational state for the one or more inactive ports in the plurality of nodes based on a change in a topology of the hybrid network.

31. The system of claim 27, wherein the processor circuit is configured to manage power consumption of the plurality of nodes by controlling the operational state of the plurality of ports in the plurality of nodes.

32. The system of claim 27, wherein the one or more active ports are in a low power state when the processor circuit transmits the message to the one or more active ports.

33. The system of claim 32, wherein the low power state is one of a sleep mode, a hibernation mode, or a power savings mode.

* * * * *